United States Patent
Ukeda

(10) Patent No.: US 10,093,234 B2
(45) Date of Patent: *Oct. 9, 2018

(54) IMAGE DISPLAY SYSTEM AND DISPLAY USED IN IMAGE DISPLAY SYSTEM

(71) Applicant: PANASONIC INTELLECTUAL PROPERTY MANAGEMENT CO., LTD., Osaka (JP)

(72) Inventor: Takaaki Ukeda, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/787,830

(22) Filed: Oct. 19, 2017

(65) Prior Publication Data

US 2018/0037163 A1 Feb. 8, 2018

Related U.S. Application Data

(63) Continuation of application No. 14/714,246, filed on May 15, 2015, now Pat. No. 9,845,053.

(30) Foreign Application Priority Data

May 20, 2014 (JP) .................................. 2014-104277

(51) Int. Cl.
*H04N 9/47* (2006.01)
*H04N 7/18* (2006.01)
*B60R 1/00* (2006.01)

(52) U.S. Cl.
CPC .......... *B60R 1/00* (2013.01); *B60R 2300/202* (2013.01); *B60R 2300/802* (2013.01)

(58) Field of Classification Search
None
See application file for complete search history.

(56) References Cited

U.S. PATENT DOCUMENTS

2002/0003571 A1* 1/2002 Schofield ................ B60C 23/00
348/148
2004/0263528 A1 12/2004 Murdoch et al.
(Continued)

FOREIGN PATENT DOCUMENTS

JP 2-115736 9/1990
JP 4-095541 3/1992
(Continued)

*Primary Examiner* — Talha M Nawaz
(74) *Attorney, Agent, or Firm* — Greenblum & Bernstein, P.L.C.

(57) ABSTRACT

An image display system includes a display provided on an interior surface of a vehicle body structure, including a front pillar, and a camera that captures an image of an extended region including an image of a blind spot region outside the vehicle body structure. When the door is in a closed state, the image display system causes the display to display the image of the blind spot region. The image of the blind spot region is generated based on the image of the extended region captured by the camera, by extracting, from the image of the extended region, the image of the blind spot region in a shape of the display. An interior surface of the front pillar includes a curved shape. The display is provided in the interior surface of the front pillar along the curved shape of the interior surface of the front pillar.

16 Claims, 9 Drawing Sheets

(56) References Cited

U.S. PATENT DOCUMENTS

| | | | |
|---|---|---|---|
| 2007/0072154 A1 | 3/2007 | Akatsuka et al. | |
| 2009/0185127 A1 | 7/2009 | Tanaka et al. | |
| 2010/0244698 A1 | 9/2010 | Nakamura | |
| 2010/0253596 A1* | 10/2010 | Szczerba | G01S 13/723 345/7 |
| 2011/0090073 A1 | 4/2011 | Ozaki | |
| 2011/0128139 A1* | 6/2011 | Tauchi | B60K 35/00 340/439 |
| 2014/0375206 A1* | 12/2014 | Holland | H02J 9/061 315/86 |
| 2016/0137126 A1* | 5/2016 | Fursich | B60R 1/00 348/38 |

FOREIGN PATENT DOCUMENTS

| | | |
|---|---|---|
| JP | 7-017647 | 3/1995 |
| JP | 2004-182012 | 7/2004 |
| JP | 2007-096638 | 4/2007 |
| JP | 2007-524109 | 8/2007 |
| JP | 2008-089682 | 4/2008 |
| JP | 2009-120144 | 6/2009 |
| JP | 2009-154641 | 7/2009 |
| JP | 2010-058742 | 3/2010 |
| JP | 2011-213184 | 10/2011 |
| JP | 2012-008153 | 1/2012 |
| WO | 2008/013013 | 1/2008 |
| WO | 2009/157446 | 12/2009 |

* cited by examiner

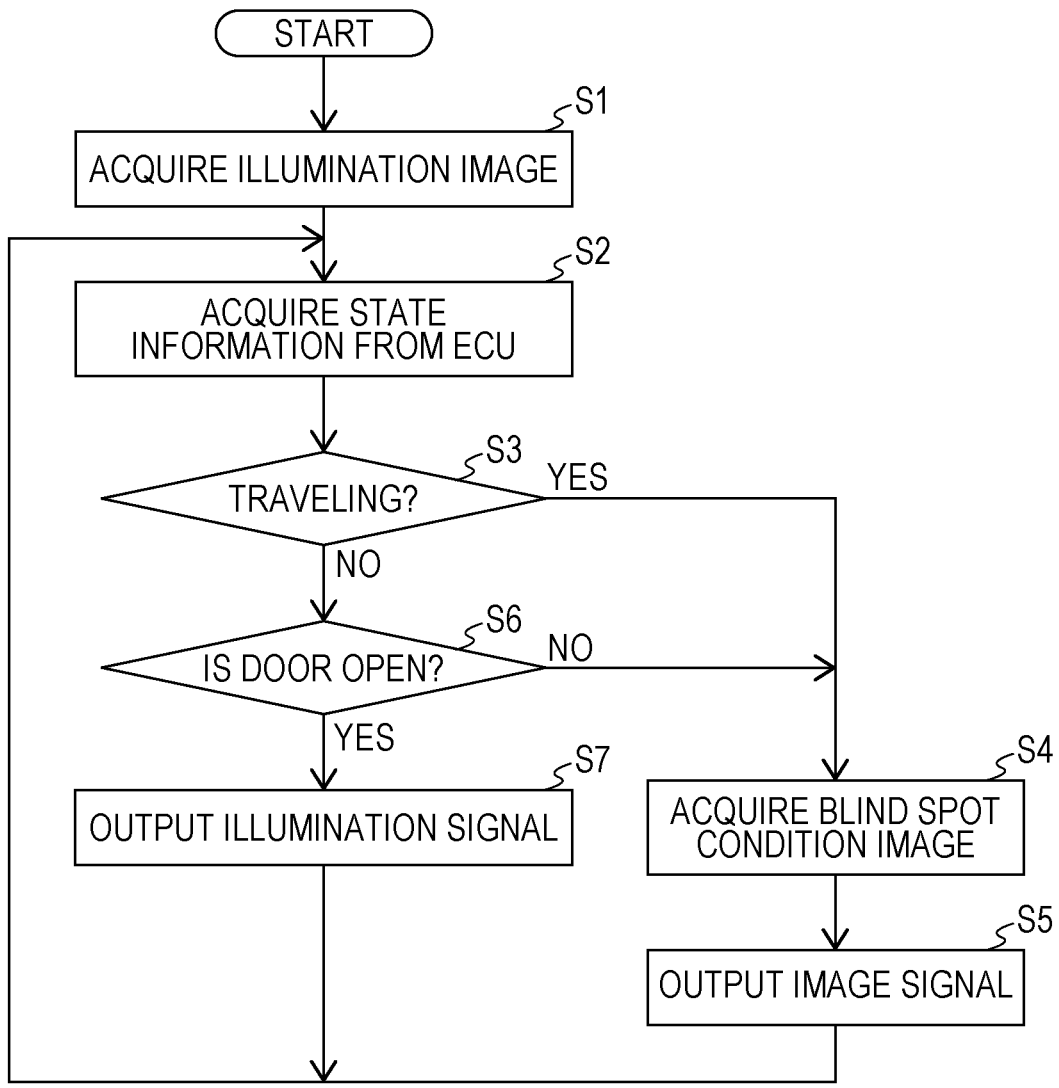

IMAGE DISPLAY SYSTEM AND DISPLAY USED IN IMAGE DISPLAY SYSTEM

This application is a continuation application of U.S. application Ser. No. 14/714,246, filed on May 15, 2015, which claims the benefit of Japanese Application No. 2014-104277, filed on May 20, 2014, the disclosures of which are incorporated by reference herein in their entireties.

BACKGROUND

1. Technical Field

The present disclosure relates to an image display system to be mounted on a vehicle.

2. Description of the Related Art

A conventional image display system to be mounted on a vehicle such as a car displays an image showing situations around a vehicle on a display. In particular, safe drive of the vehicle can be assisted by displaying an image of a region forming a blind spot to the driver.

For example, a vehicle body structure such as a front pillar forms a blind spot by blocking the field of view of the driver. Japanese Unexamined Patent Application Publication No. 2007-096638 discloses a technique of providing a display at a location of the front pillar visible to the driver. By displaying a captured image of a blind spot region formed by the front pillar on a display, the driver can confirm blind spot condition without shifting the line of sight from a direction of the front pillar.

SUMMARY

In one general aspect, the techniques disclosed here feature an image display system to be mounted within a vehicle, the vehicle including a door that is provided on a doorway and a vehicle body structure that blocks view of a driver of the vehicle. The image display system comprises: a display provided in an interior surface of the vehicle body structure and including a first display region facing the doorway; a camera adapted to capture an image of a blind spot region outside the vehicle body structure, wherein the blind spot region is caused by the view of the driver to be blocked by the vehicle body structure; and a controller adapted to cause the display to display the image of the blind spot region when the door is in a closed state, and to cause the display to display an illumination image of a fixed pattern using at least the first display region of the display to light the doorway when the door is in an open state.

According to the above aspect, when the door is in the closed state, an image displayed on a display provided in an interior portion of a vehicle body structure forming a blind spot notifies the driver of the condition in the blind spot region. On the other hand, when the door is in the open state, occupant getting-on/off can be assisted with a light of an illumination image displayed by the display.

Here, a region in the display surface "faces the doorway" means that the region is formed approximately toward the doorway to the extent that a light emitted from the region during light emission of the display is illuminated around the doorway.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 6 shows a processing procedure of an image display/illumination switching processing in an image/illumination controller;

DETAILED DESCRIPTION

Figure 1:
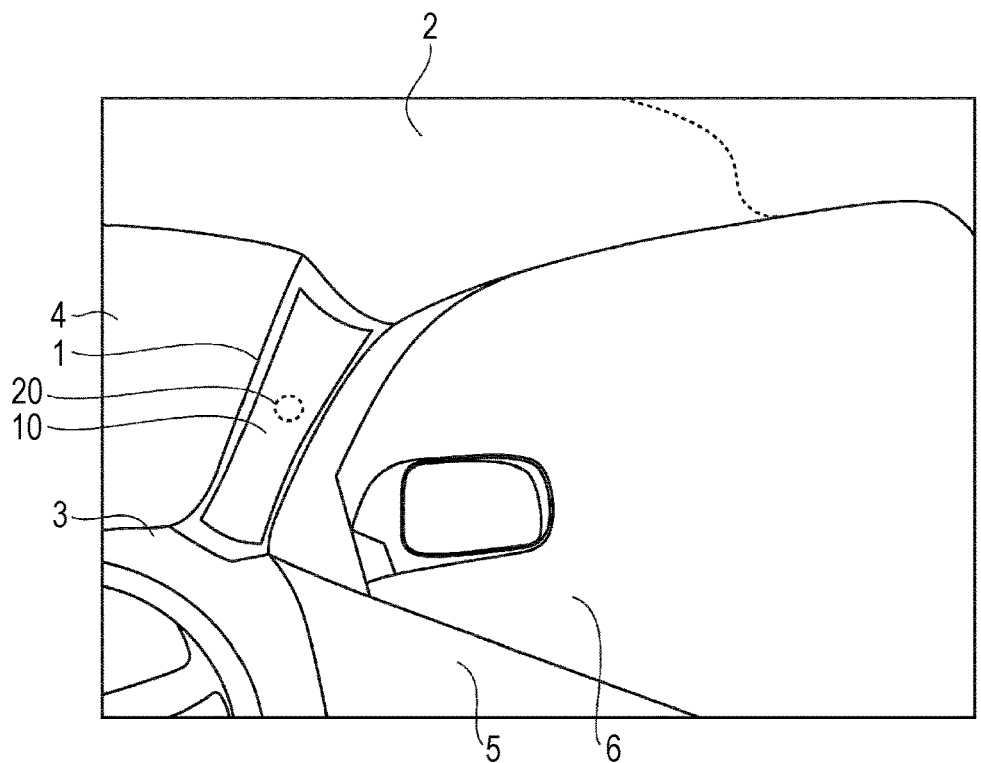
FIG. 1 shows a usage mode of an image display system according to an aspect of the present disclosure.

A vehicle may be provided with an illumination that lights to assist occupant getting-on/off when the door is in the open state. Normally, a room light provided at the center of a ceiling section illuminates above the driver's seat which can be illuminated directly, but step illumination in the vicinity of the door is apt to be insufficient due to a shadow of the driver. A technique disclosed in Japanese Unexamined Patent Application Publication No. 2009-120144 provides an illumination at a door, which, however, may be unable to sufficiently illuminate driver's foot depending on the opening angle of the door. For solving the problem, it is considered effective to provide an illumination in an interior portion of a vehicle body structure around the door such as a front pillar.

However, in view that a vehicle body structure around the door such as the front pillar is at a position blocking an external field of view of the driver, installation of a display showing an external image is preferable. However, if a display is provided in an interior portion of such a vehicle body structure, there is a problem that separate installation of an illumination of sufficient light intensity at the same portion is difficult in terms of space.

The present disclosure provides a an image display system, and a display used for the image display system, capable of not only displaying an image but also assisting occupant getting-on/off by an illumination at an interior portion of a vehicle body structure forming a blind spot for a driver.

One non-limiting and exemplary embodiment provides a an image display system, and a display used for the image display system, capable of not only displaying an image but also assisting occupant getting-on/off by an illumination at an interior portion of a vehicle body structure forming a blind spot for a driver.

An image display system according to a first aspect of the present disclosure is an image display system to be mounted within a vehicle, the vehicle including a door that is provided on a doorway and a vehicle body structure that blocks view of a driver of the vehicle, the image display system comprising: a display provided in an interior surface of the vehicle body structure and including a first display region facing the doorway; a camera adapted to capture an image of a blind spot region outside the vehicle body structure, wherein the blind spot region is caused by the view of the driver to be blocked by the vehicle body structure; and a controller adapted to cause the display to display the image of the blind spot region when the door is in a closed state, and to cause the display to display an illumination image of a fixed pattern using at least the first display region of the display to light the doorway when the door is in an open state.

According to the first aspect, when the door is in the closed state, an image displayed on a display provided in an interior portion of a vehicle body structure forming a blind spot notifies the driver of the condition in the blind spot region. On the other hand, when the door is in the open state, the light of the illumination image displayed by the display can assist a person in the vehicle to get on or off the vehicle.

A second aspect of the present disclosure is such that in the first aspect, for example, the vehicle may further include a windshield, and a front pillar located at a boundary between the door and the windshield, the vehicle body structure may comprise the front pillar.

The front pillar forms a blind spot in the travel direction when making a right turn or a left turn. According to the second aspect, when the door is in the closed state, the image of the blind spot region is displayed on the display provided on the surface of the front pillar on the interior side, so that safety at a right turn and a left turn can be enhanced.

A third aspect of the present disclosure is such that in the second aspect, for example, the interior surface of the front pillar may include a curved shape, the display may be provided in the interior surface of the front pillar along the curved shape of the interior surface of the front pillar, and the display may further include a second display region not facing the doorway.

According to the third aspect, when the door is in the open state, the region facing the doorway on the curved display surface of the display can emit the light. Accordingly, the light of the illumination image displayed by the display can assist a person in the vehicle to get on or off the vehicle.

A fourth aspect of the present disclosure is such that in the first aspect, for example, the display may comprise pixels, and when the fixed pattern in the illumination image is displayed using the at least the first display region, at least two pixels included in the first display region may be lit with the same brightness.

According to the fourth aspect, when the door is in the open state, each of the pixels emits light with the same brightness. Thus, the light of the illumination image displayed by the display can assist a person in the vehicle to get on or off the vehicle with uniform and high visibility illumination.

A fifth aspect of the present disclosure is such that in the first aspect, for example, the display may comprise pixels including sub-pixels of different colors, and when the fixed pattern in the illumination image is displayed using the at least the first display region, a ratio of a brightness among sub-pixels included in at least two pixels of the first display region is the same among the at least two pixels.

According to the fifth aspect, when the door is in the open state, each of the pixels emits a light in color tones of the same system. Thus, the light of the illumination image displayed by the display can assist a person in the vehicle to get on or off the vehicle with uniform and high visibility illumination.

A sixth aspect of the present disclosure is such that in the first aspect, for example, the display may comprise pixels, the display may further include a second display region not facing the doorway, and when the fixed pattern in the illumination image is displayed using the at least the first display region, all pixels included in the first display region of the pixels may be lit with a first brightness, and all pixels included in the second display region of the pixels may be lit with a second brightness that is lower than the first brightness.

According to the sixth aspect, a light is emitted from the first display region facing the doorway in the direction of the doorway on the display surface. But, when a light is emitted in a different direction from the second display region on the display surface, unnecessarily bright illumination of an area not assisting the person in the vehicle to get on or off can be prevented.

A seventh aspect of the present disclosure is such that in the sixth aspect, for example, the vehicle may further include a windshield, and a front pillar located at a boundary between the door and the windshield, the vehicle body structure may comprise the front pillar, an interior surface of the front pillar may include a shape curved from a portion closer to the door to a portion closer to the windshield, the display may be provided in the interior surface of the front pillar along the curved shape of the interior surface of the front pillar, the first display region may be located at a portion closer to the door on the interior surface of the front pillar, and the second display region may be located at a portion closer to the windshield on the interior surface of the front pillar.

According to the seventh aspect, when the door is in the open state, the display surface emits light at the first display region located closer to the door, so that the first display region in the direction of doorway is illuminated. On the other hand, when the door is in the open state, brightness of light emitted by the display surface at the second display region located closer to the windshield is reduced, so that reflection thereof onto the windshield can be suppressed.

An eighth aspect of the present disclosure is such that in the first aspect, for example, the camera may be adapted to capture an image of an extended region including the image of the blind spot region, the image display system may further comprise an image generator adapted to generate the image of the blind spot region based on the image of the extended region captured by the camera, by cutting the image of the blind spot region from the image of the extended region in a shape of the display.

According to the eighth aspect, since a portion not included in the shape of the display surface is removed from the captured image, the image of the blind spot region can be displayed on the display as if the blind spot were continuous to a region outside the vehicle body structure which is not in the blind spot region and can be viewed actually.

A ninth aspect of the present disclosure is such that in the first aspect, for example, the image display system may further comprise an image generator adapted to determine whether the image of the blind spot region includes a human image, and if the human image is included in the image of the blind spot region, to generate a symbol image that attracts attention of the driver to a human represented by the human image to combine the image of the blind spot region with the symbol image.

According to the ninth aspect, a situation that a person such as a pedestrian is in the blind spot can be highlighted to attract attention of the driver. This prevents the driver from overlooking a human image.

A tenth aspect of the present disclosure is such that in the first aspect, for example, the display may include a first light emitting element which emits red light, a second light emitting element which emits blue light, a third light emitting element which emits green light, and a fourth light emitting element which emits illumination light, and the controller may be adapted to cause the fourth light emitting element to emit the illumination light when causing the display to display the illumination image.

According to the tenth aspect, when the door is in the open state, the illumination light can assist a person in the vehicle to get on or off the vehicle.

An eleventh aspect of the present disclosure is such that in the tenth aspect, for example, the first light emitting element, the second light emitting element, the third light emitting element, and the fourth light emitting element may be current driven type light emitting elements, and a light emission area of the fourth light emitting element may be smaller than a light emission area of any of the first light emitting element, the second light emitting element, and the third light emitting element.

The current driven type light emitting element having higher current density emits light with higher brightness. Assuming that current is constant, smaller the light emission area of the light emitting element, higher the current density. Thus, according to the eleventh aspect, when a same current flows, the light emitting element which emits the illumination light emits the light with brightness higher than other light emitting elements. Accordingly, the illumination light of higher brightness can assist a person in the vehicle to get on or off the vehicle.

A twelfth aspect of the present disclosure is such that in the tenth aspect, for example, the display may include a lens on an optical path of the light emitted from the fourth light emitting element which emits the illumination light.

According to the twelfth aspect, directivity of the illumination light emitted from the light emitting element can be adjusted. Consequently, the step of a person in the vehicle can be illuminated efficiently.

A thirteenth aspect of the present disclosure is such that in the first aspect, for example, the vehicle may further include a driver seat, a passenger seat, a windshield, a first door on a side of the driver seat, a second door on a side of the passenger seat, a first front pillar located at a boundary between the first door and the windshield, and a second front pillar located at a boundary between the second door and the windshield, the vehicle body structure may be each of the first front pillar and the second front pillar, the display may be provided on an interior surface of each of the first front pillar and the second front pillar, and the controller may be adapted to cause the display provided on the interior surface of the first front pillar to display the illumination image when the first door is in the open state, and to cause the display provided on the interior surface of the second front pillar to display the illumination image when the second door is in the open state. A fourteenth aspect of the present disclosure is such that in the first aspect, for example, the image display system may further include an electronic control circuit adapted to detect whether the door is in the open state or in the closed state, in which the controller may be adapted to control the display based on the detection by the electronic control circuit. The electronic control circuit may be an electronic control unit.

According to the thirteenth aspect, a person in the vehicle can be assisted to get on or off the vehicle at the driver seat and passenger seat respectively.

A display according to a fifteenth aspect of the present disclosure is a display which is mounted within a vehicle including a door that is provided on a doorway and a vehicle body structure that blocks view of a driver of the vehicle. The display is provided in an interior surface of the vehicle body structure and including a first display region facing the doorway. The display is adapted to be controlled to display an image of a blind spot region outside the vehicle body structure when the door is in a closed state, in which the blind spot region is caused by the view of the driver to be blocked by the vehicle body structure. The display is also adapted to be controlled to display an illumination image of a fixed pattern using at least the first display region of the display to light the doorway when the door is in an open state.

According to the fifteenth aspect, when the door is in the closed state, the driver is notified of the condition of the blind spot region by the image displayed on the display. On the other hand, when the door is in the open state, the light of the illumination image displayed by the display can assist a person in the vehicle to get on or off the vehicle.

Hereinafter, embodiments of the image display system according to the aspects are described by using the accompanying drawings.

First Embodiment

<Overall Configuration of Image Display System>

FIG. 1 shows a usage mode of an image display system according to an aspect of the present disclosure. FIG. 1 shows a right front part of a vehicle's cabin. Vehicle body structures including a front pillar 1, a ceiling section 2 supported by the front pillar 1, a dashboard 3 provided at a base of the front pillar 1, and a door 5 are arranged at the right front part of the cabin. The door 5 is attached to a doorway disposed on a side of the vehicle body in an openable manner. The vehicle body structures on the side of the passenger seat are arranged symmetrically at right and left sides relative to this figure.

A space surrounded by the front pillar 1, the ceiling section 2, and the dashboard 3 is provided with a windshield 4. The door 5 is provided with a side window 6. At the right front part of the cabin, the cabin and the outside of the vehicle are separated from each other with the vehicle body structures and glasses.

The front pillar 1 in the cabin has a bulged section for housing an air bag. Consequently, the surface of the front pillar 1 has a curved shape (hereinafter, the surface of the front pillar on the cabin side is simply referred to as the "surface of the front pillar 1"). A display 10 is provided on the surface of the front pillar 1. The display 10 is an organic EL display panel used for both image display and illumination, and installed in a shape curving along a shape of the surface of the front pillar 1.

A camera 20 is provided inside the front pillar 1. The camera 20 is provided on the vehicle exterior side of the front pillar 1, with the lens thereof oriented toward a right oblique forward direction from the vehicle. For this reason, an image captured with the camera 20 is something close to a scene on an extension line of the driver's eyes toward the front pillar 1 at a position seated on the driver's seat (hereinafter referred to as the "driving posture").

In a cabin of such configuration, the driver can visually recognize vehicle's exterior situations through the windshield 4, and the side window 6. However, a blind spot is formed outside the vehicle by a vehicle body structure such as the front pillar 1, the ceiling section 2, the dashboard 3, and the door 5.

In view of the problem, the image display system according to the aspect displays, on the display 10, an image indicating the condition of the blind spot region based on a captured image taken by the camera 20 (hereinafter, an image indicating the condition of the blind spot region generated based on a captured image is referred to as the "blind spot condition image"). Display of the blind spot condition image on the display 10 enables the driver to visually recognize the condition of the blind spot region formed by the front pillar 1 (hereinafter, the blind spot region formed by the pillar 1 is simply referred to as the "blind spot region").

Further, when the door 5 is opened, the image display system according to the aspect suspends display of the blind spot condition image on the display 10, and drives the display 10 in the illumination mode. In the illumination mode, the image display system causes the display 10 to display an image of a fixed pattern (hereinafter, referred to as the "illumination image") not based on a captured image taken by the camera 20 when the door 5 is opened.

Figure 2:
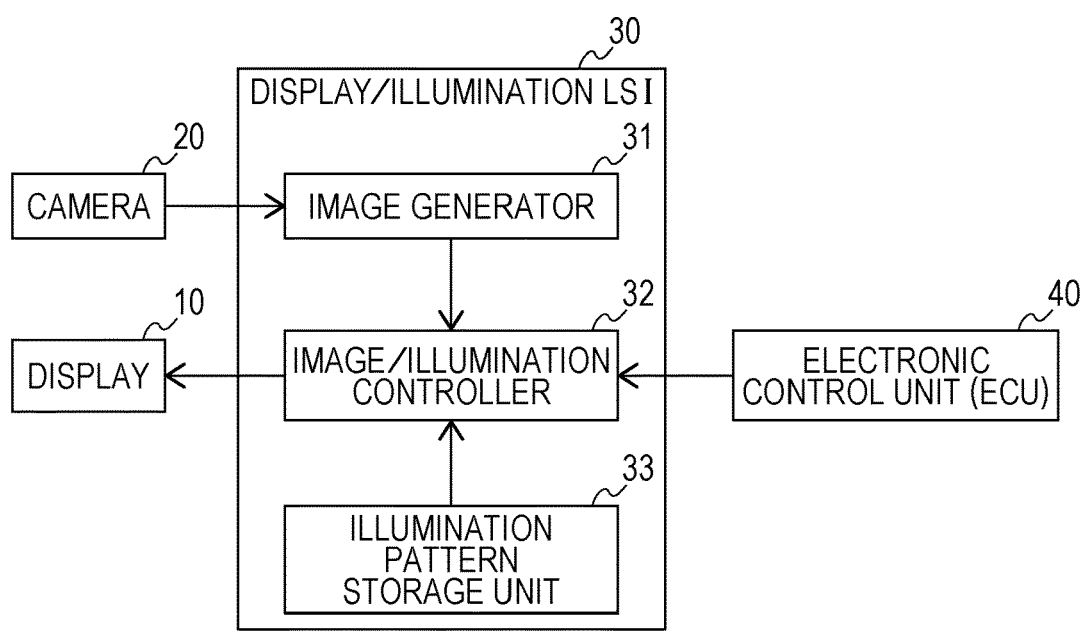
FIG. 2 shows a system configuration diagram of the image display system.

Next, a system configuration of the image display system according to the aspect is described. FIG. 2 shows a system configuration diagram of the image display system according to the aspect.

The image display system comprises a display 10, a camera 20, an image/illumination LSI 30, and an electronic control unit (ECU) 40.

[Display 10]

Figure 3:
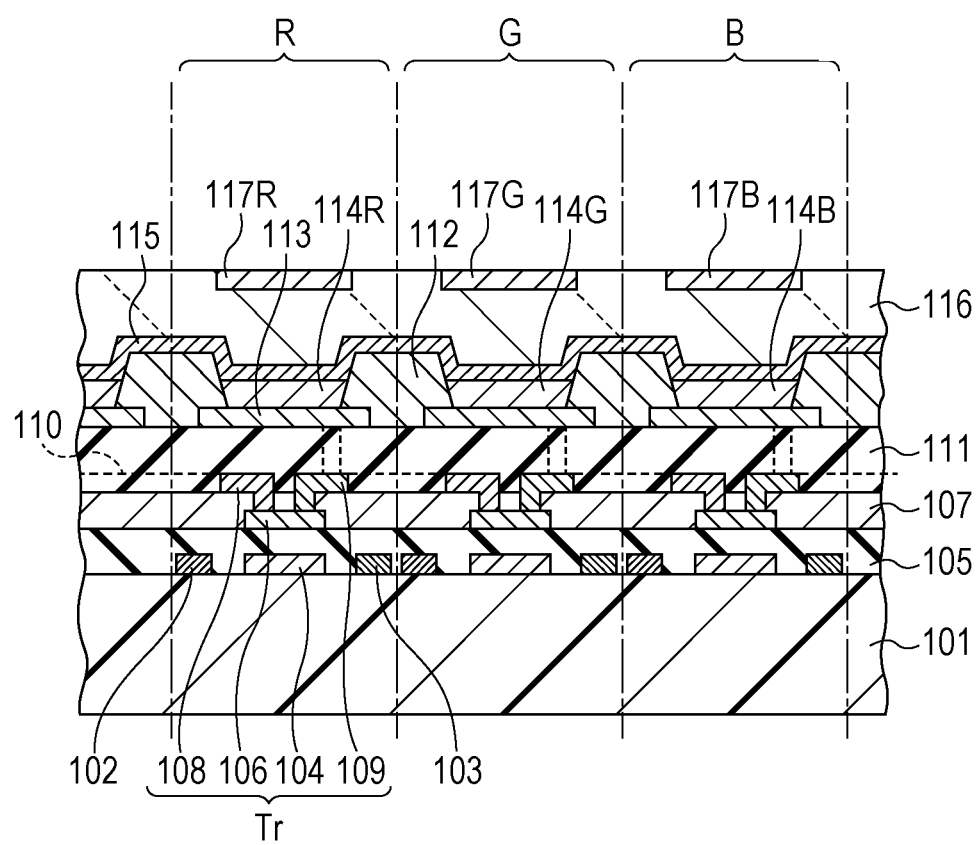
FIG. 3 is a fragmentary cross-sectional view showing a schematic configuration of a display.

The display 10 is an organic EL display panel with a display surface thereof having a long rectangular shape. FIG. 3 is a fragmentary cross-sectional view of one pixel of the display 10. A pixel includes a plurality of sub-pixels of different colors. The pixel according to this embodiment includes a red sub-pixel, a green sub-pixel, and a blue sub-pixel. The red sub-pixel has an organic EL element emitting the red light (hereinafter, referred to as the "R light emitting element"), the green sub-pixel has an organic EL element emitting the green light (hereinafter, referred to as the "G light emitting element"), and the blue sub-pixel has an organic EL element emitting the blue light (hereinafter, referred to as "B light emitting element"). In FIG. 3, a region of the R light emitting element is indicated with a sign "R", a region of the G light emitting element with a sign "G", and a region of the B light emitting element with a sign "B".

A substrate 101 is a flexible resin substrate like an organic resin film.

A wiring part including a data signal line 102, a power supply line 103, a gate electrode 104, a gate insulating layer 105, a channel layer 106, a channel protection layer 107, a source electrode 108, a drain electrode 109, and a scan signal line 110 is formed on an upper surface of the substrate 101.

The gate electrode 104, the channel layer 106, the source electrode 108, and the drain electrode 109 form a thin film transistor Tr used as a drive transistor of light emitting elements. In addition to the thin film transistor Tr, each of light emitting elements includes a thin film transistor not shown, which is used as a selection transistor.

The data signal line 102 and the power supply line 103 extend up to a region outside a display region of the display 10 in a longitudinal direction of the display surface orthogonal to a paper face. In an external region, the data signal line 102 is connected to a driver circuit not shown.

The scan signal line 110 extends up to a region outside a display region of the display 10 in a transverse direction of the display surface. In an external region, the data signal line 102 is connected to a driver circuit not shown.

An interlayer insulating film 111 is formed on an upper surface of each of the source electrode 108, the drain electrode 109, the scan signal line 110, and the channel protection layer 107. The interlayer insulating film 111 is provided with a contact hole above the drain electrode 109.

A bank 112 and an anode 113 are formed on the interlayer insulating film 111. The anode 113 is connected to the drain electrode 109 through the contact hole. The bank 112 is disposed in such a manner to extend toward a longitudinal direction of the display surface orthogonal to a paper face.

Organic light emitting layers 114R, 114G, and 114B are formed respectively in regions partitioned by the bank 112. The organic light emitting layer 114R contains, as a dopant, an organic material emitting the red light by an electroluminescent phenomenon (hereinafter, referred to as the "R organic material"). The organic light emitting layer 114G contains, as a dopant, an organic material emitting the green light by an electroluminescent phenomenon (hereinafter, referred to as the "G organic material"). The organic light emitting layer 114B contains, as a dopant, an organic material emitting the blue light by an electroluminescent phenomenon (hereinafter, referred to as the "B organic material"). In addition to the organic light emitting layers 114R, 114G, and 114B, a hole injection layer, a hole transport layer, an electron injection layer, and an electron transport layer may be provided together in regions partitioned by the bank 112.

A cathode 115 is formed uniformly to cover organic light emitting layers 114R, 114G, and 114B, and the bank 112.

A sealing layer 116 is formed on the cathode 115. The cathode 115 and the sealing layer 116 are formed of a light-transmitting material.

On the sealing layer 116, a red color filter 117R, a green color filter 117G, and a blue color filter 117B are respectively bonded above an organic light emitting layer emitting a corresponding light. Here, the color filters are provided for the chromaticity correction. If an organic light emitting layer of each of the light emitting elements emits a light of a desirable chromaticity, the color filters may not be provided necessarily.

Although reference numerals are not assigned in FIG. 2, each of regions of the G light emitting element and the B light emitting element has the same configuration as the region of the R light emitting element except the organic light emitting layers 114R, 114G, and 114B, and the color filters 117R, 117G, and 117B.

Pixels of such configuration are formed to be arranged in a matrix shape along the substrate 101 to constitute the active matrix driven display 10. In the active matrix driven control, the current amount supplied by the respective light emitting element from the thin film transistor Tr to the organic light emitting layer is controlled by an input signal in the data signal line 102, and the scan signal line 110. Consequently, brightness of each of light emitting elements on the display 10 is controlled.

[Camera 20]

The camera 20 is a digital video camera. Captured images taken by the camera 20 are sequentially outputted to the image/illumination LSI 30.

[Image/Image/Illumination LSI 30]

The image/illumination LSI 30 is provided inside the dashboard 3. The image/illumination LSI 30 includes an image generator 31, a display/illumination controller 32, and an illumination pattern storage unit 33.

The image generator 31 sequentially generates a blind spot condition image for displaying on the display 10 based on a captured image inputted from the camera 20.

Figure 4A:
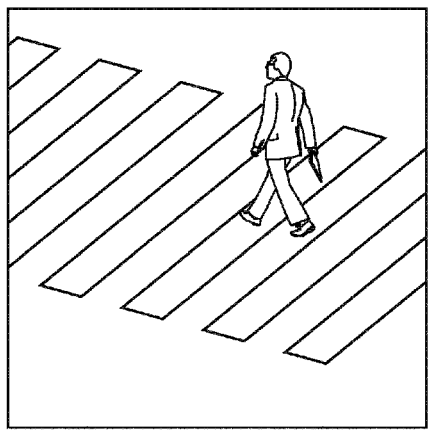
FIG. 4A shows an example of a captured image taken by a camera.
Figure 4B:
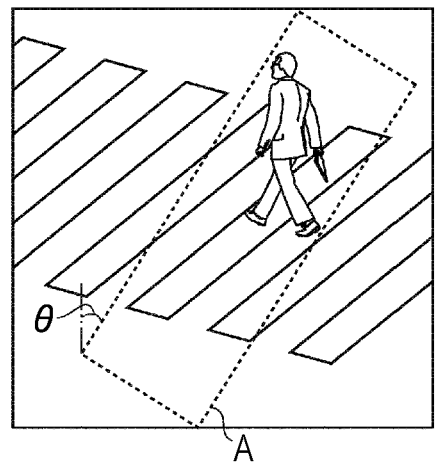
FIG. 4B shows a cutout region in the captured image.
Figure 4C:
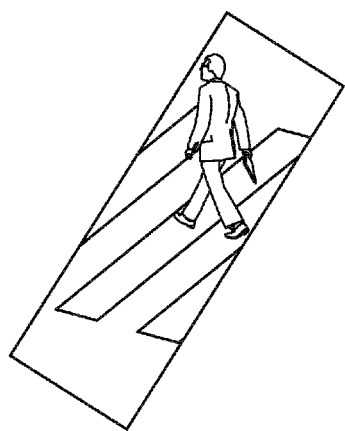
FIG. 4C shows an image cut out from the captured image.
Figure 4D:
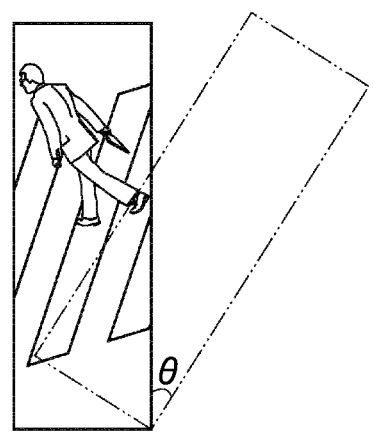
FIG. 4D shows a blind spot condition image obtained by rotating the cutout image.

FIGS. 4A to 4D illustrate steps for generating a blind spot condition image in the image generator 31. FIG. 4A shows a captured image taken by the camera 20. The captured image includes a blind spot region formed by the front pillar 1 as it captures a right oblique forward scene of the vehicle. When generating the blind spot condition image, the image generator 31 first cuts out an image of a cutout region indicated by broken lines A in FIG. 4B from the captured image. The shape of the cutout region conforms to a shape of the display surface of the display 10. The inclination angle θ of the cutout region is determined based on the inclination of the front pillar 1. FIG. 4C shows a cutout image. The cutout image is rotated by the inclination angle θ, and coordinate transformation into an orthogonal coordinate system is performed with X axis and Y axis long each side of the image to obtain a blind spot condition image shown in FIG. 4D.

The display/illumination controller 32 is a controller in the image display system according to the aspect, the controller performing a switching control to drive the display 10 in either the image display mode or the illumination mode in response to an open/closed state of the door 5.

When the door 5 is in the closed state, the display/illumination controller 32 causes the display 10 to drive in the image display mode. To cause the display 10 to drive in the image display mode, the display/illumination controller 32 sequentially acquires image data of the blind spot condition image generated by the image generator 31. Based on the acquired image data of the blind spot condition image, the display/illumination controller 32 generates a signal indicating the brightness of R, G, and B color light emitting elements for each of pixels via the data signal line and the scan signal line. The display/illumination controller 32 outputs the generated signal to the data signal line 102 and the scan signal line 110 of the display 10. Hereinafter, the signal causing the display 10 to display the blind spot condition image is referred to as the "image signal".

When the door 5 is in the open state, the display/illumination controller 32 causes the display 10 to drive in the illumination mode. To cause the display 10 to drive in the illumination mode, the display/illumination controller 32 sequentially acquires image data of the illumination image stored in the illumination pattern storage unit 33. Based on the acquired image data of the illumination image, the display/illumination controller 32 generates a signal indicating the brightness of R, G, and B color light emitting elements for each of pixels via the data signal line and the scan signal line. The display/illumination controller 32 outputs the generated signal to the data signal line 102 and the scan signal line 110 of the display 10. Hereinafter, the signal causing the display 10 to display the illumination image is referred to as the "illumination signal".

The illumination pattern storage unit 33 keeps the illumination image. The illumination image according to the embodiment is an image comprising two parts formed by dividing the display surface of the display 10, the two parts including a portion closer to the door 5 where all pixels are caused to display white of maximum brightness, and a portion closer to the windshield 4 where all pixels are caused to display black of zero brightness. Thus, when the illumination image is displayed on the display 10, light emitting elements in the portion closer to the door 5 emit lights of maximum brightness. Thereby, light exiting from the portion closer to the door 5 has light intensity sufficient for illumination.

Although the display 10 is provided along the shape of the surface of the front pillar 1, the surface of the front pillar 1 on the cabin side in the vehicle is, in many cases, formed with a portion thereof closer to the door 5 being oriented approximately in the direction of the doorway. In such a case, light emitted from a region of the display surface of the display 10 closer to the door 5 heads approximately in the direction of the doorway.

The illumination pattern storage unit 33 saves the illumination image as image data indicating the brightness value of sub-pixels R, G, and B for each of pixels the display 10. Alternatively, the illumination image may be saved as a drawing command with the coordinate of the light emitting region, and the brightness in the light emitting region as operands.

[ECU 40]

The ECU 40 is an electronic control unit that manages an electrical equipment system of the vehicle. The ECU 40 collects information of the open/closed state of the door 5, and the travel/stop state of the vehicle from sensors provided on the vehicle body, and generates vehicle state information indicating those states. The display/illumination controller 32 is notified of the generated vehicle state information periodically.

Figure 5A:
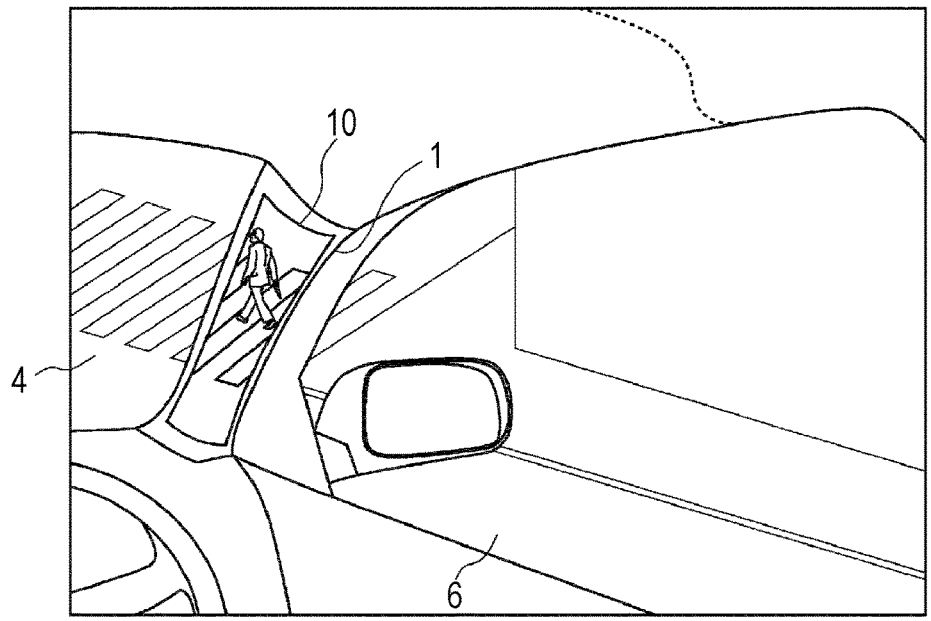
FIG. 5A shows an exemplary operation in an image display mode.
Figure 5B:
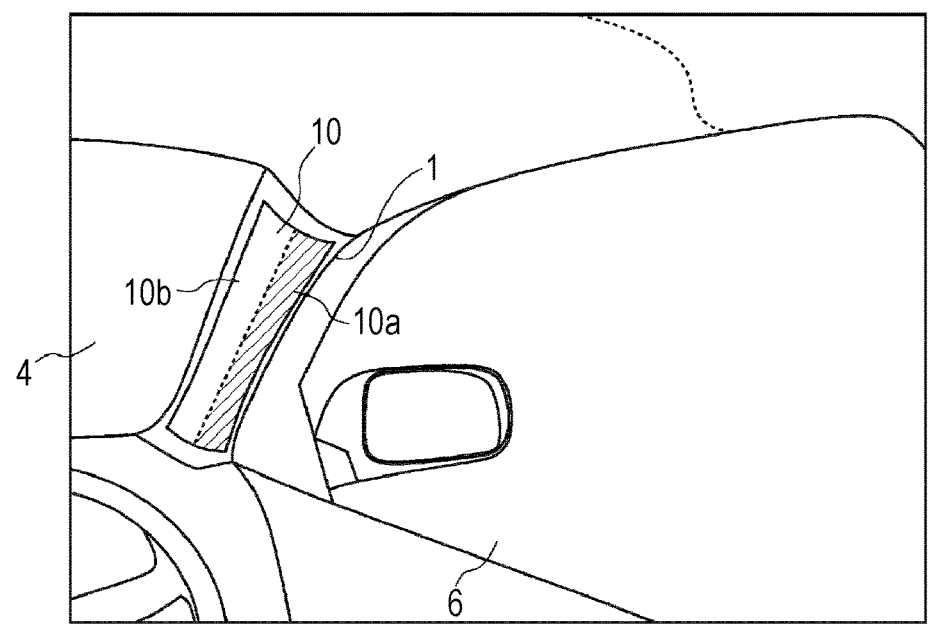
FIG. 5B shows an exemplary operation in an illumination mode.

In the image display system configured as above, the blind spot condition image is displayed on the display 10 as illustrated in FIG. 5A when the door is in the open state. When the door 5 is in the open state, a region 10A of the display 10 is in a light emitting state, and a region 10B thereof is in a non-light emitting state, as illustrated in FIG. 5B.

Normal line of the surface of the front pillar 1 on a side contacting the door 5 is approximately in parallel with the door 5 closed. Thus, in the illumination mode, the occupant step is illuminated at the doorway of the vehicle by a light emitted from light emitting elements in the region 10A closer to the door 5.

On the other hand, normal line of the surface of the front pillar 1 on a side contacting the windshield 4 is approximately in parallel with the windshield 4. In the illumination mode, however, reflection of the display 10 on which illumination image is displayed is suppressed due to no light emitted from light emitting elements in the region 10B closer to the windshield 4.

<Detail of Switching Processing>

Next, detail of the switching processing in the display/illumination controller 32 is described. FIG. 6 is a flowchart showing a flow of the switching processing in the display/illumination controller 32.

In the switching processing, the display/illumination controller 32 first reads the illumination image from the illumination pattern storage unit 33, and saves in an internal buffer (step S1).

Then, when notified of the vehicle state information by the ECU 40 (step S2), the display/illumination controller 32 performs processing of steps S3 to S7 in response to the acquired vehicle state information.

In the step S3, the display/illumination controller 32 determines based on the vehicle state information whether the vehicle is in the travel state. When the vehicle state information indicates that the vehicle is in the travel state (step S3: Yes), the display/illumination controller 32 acquires the blind spot condition image from the image generator 31 (step S4). After the step S4, the display/illumination controller 32 generates the image signal based on the acquired blind spot condition image, and outputs the image signal to the display 10 (step S5).

When determined in the step S3 that the vehicle state information indicates the vehicle is in the stop state (step S3: No), the display/illumination controller 32 further determines based on the vehicle state information whether the door 5 is in the open state (step S6). When the vehicle state information indicates that the door 5 is in the closed state (step S6: No), the display/illumination controller 32 performs the step S4 and S5 to output the image signal to the display 10.

When determined in the step S6 that the vehicle state information indicates that the door 5 is in the open state (step S6: Yes), the display/illumination controller 32 generates the illumination signal based on the illumination image saved in the buffer, and outputs to the display 10 (step S7).

After completion of output of the image signal in the step S5, or output of the illumination signal in the step S7, the process returns to the step S2. Then, processing of steps S3 to S7 is performed repeatedly every time notification of new vehicle state information is given by the ECU 40.

In accordance with the above processing procedure, the display/illumination controller 32 causes the display 10 to drive in the illumination mode when the door 5 is in the open state when the vehicle is in the stop state, and causes the display 10 to drive in the image display mode in other cases.

<Summary>

With the configuration described above, the image display system according to the aspect displays the blind spot condition image on the display 10 provided on the front pillar 1, so that the driver can visually recognize the condition of the blind spot formed by the front pillar 1. When the door is in the open state, the illumination image is displayed on the display 10 provided on the front pillar 1, so that the driver can get on or off the vehicle with his step illuminated.

Second Embodiment

In the second embodiment, an organic EL display panel of a configuration different from the first embodiment is provided on the display 10.

<Configuration>

(Display 10)

Figure 7:
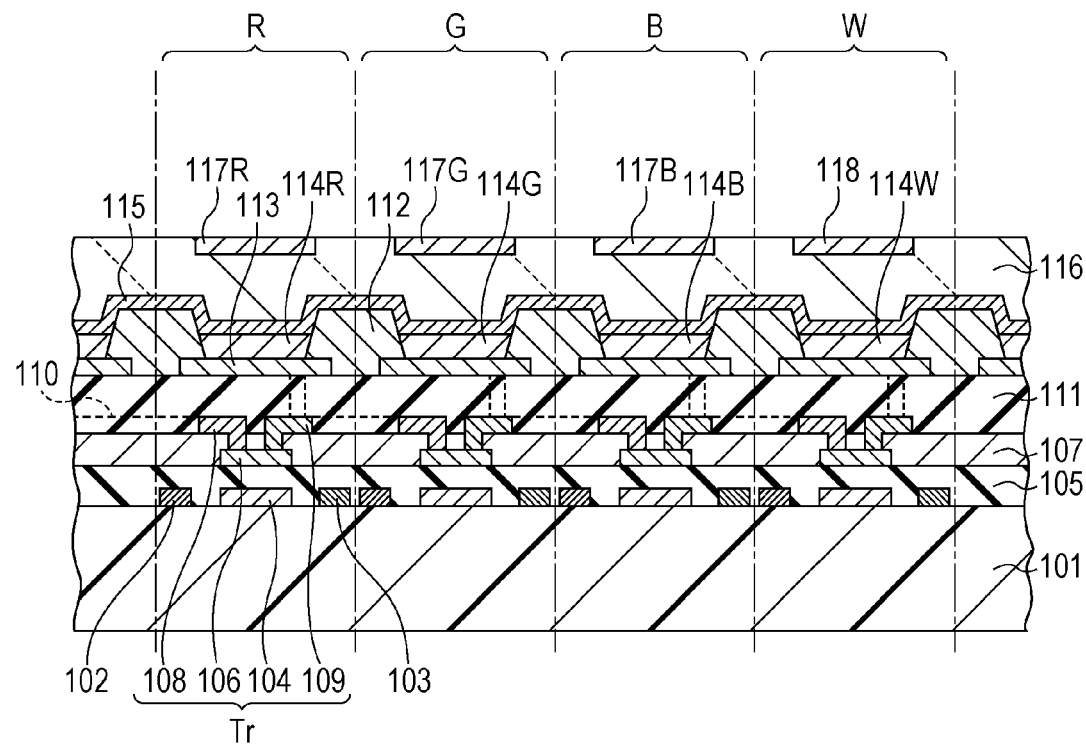
FIG. 7 is a fragmentary cross-sectional view showing a schematic configuration of a display with addition of an illumination light emitting element according to a second embodiment.

FIG. 7 is a fragmentary cross-sectional view showing one pixel of a display 10 according to the second embodiment. The pixel shown in FIG. 7 has a configuration different from FIG. 3 in respect that the pixel comprises four sub-pixels including a red sub-pixel, a green sub-pixel, a blue sub-pixel, and a white sub-pixel for illumination. The white sub-pixel has an organic EL element emitting a white light (hereafter referred to as the "illumination light emitting element"). In FIG. 7, a region of the illumination light emitting element is assigned with a reference numeral "W".

An organic light emitting layer 114W is a function layer in the illumination light emitting element, and contains the B organic material as the dopant similarly with the organic light emitting layer 114B.

The color filter 118 bonded to the sealing layer 116 above the organic light emitting layer 114W contains a phosphor material emitting an yellow light by absorbing a blue light.

Therefore, the illumination light emitting element emits a white light comprising a mixture of a blue light transmitting the color filter 118, and a yellow light emitted by the phosphor material in the color filter 118.

(Display/Illumination Controller 32)

When driving the display 10 in the image display mode, the display/illumination controller 32 generates and outputs an image signal causing the R light emitting element, the G light emitting element, and the B light emitting element to emit a light, and causing the illumination light emitting element not to emit a light.

When driving the display 10 in the illumination mode, the display/illumination controller 32 generates and outputs an illumination signal causing the R light emitting element, the G light emitting element, the B light emitting element, and the illumination light emitting element to emit a light in response to the image.

The illumination image according to the second embodiment can be saved in the illumination pattern storage unit 33 as image data with brightness of R, G, B and W designated per pixel, or as a drawing command with designation of the coordinate of the light emitting region, and designation of the brightness.

<Summary>

With the configuration described above, the image display system according to the second embodiment causes R, G, B, and illumination light emitting elements to emit a light when displaying the illumination image. Thus, when the door 5 is in the open state, the doorway can be illuminated with a high illumination.

(Modification 1)

The organic light emitting layer 114W may contain a mixture of the R organic material, the G organic material, and the B organic material as a dopant. In this case, it is preferable to increase the mixing amount in the order of the B organic material, the G organic material, and the R organic material. This is because the B organic material emits not only a blue light but also a red light and a green light when shifting from an excited state to the ground state, and the G organic material emits not only a green light but also a red light when shifting from an excited state to the ground state. With such configuration, the organic light emitting layer 114W emits a white light comprising a red light, a green light, and a white light mixed with a green light.

When forming the organic light emitting layer 114W by containing a mixture of the R organic material, the G organic material, and the B organic material as a dopant, the color filter 118 is preferably formed by not containing a phosphor material which emits a yellow light by absorbing a blue light.

<Modification 2>

When driving the display 10 in the illumination mode, the display/illumination controller 32 may generate an illumination signal causing the illumination light emitting element to emit a light in response to the illumination image, and causing the R light emitting element, the G light emitting element, and the B light emitting element not to emit a light, and output the illumination signal to the display 10.

When such an illumination signal is outputted, only the illumination light emitting element emits a light on the display 10 in response to the illumination image. That is, when the door 5 is in the open state, a white illumination light can be emitted. This enables the driver to get on or off the vehicle with his step illuminated with a white light of high visibility.

<Modification 3>

The display 10 may be formed with pixels of different configurations for each of regions on the display surface.

For example, when a portion of the illumination image displayed in the region 10b is a black color with the brightness of zero, the illumination light emitting element does not emit the light in the region 10b even in the illumination mode.

In the region 10a illustrated in FIG. 5B, four light emitting elements including R, G, B and illumination may be formed in one pixel, and only three light emitting elements including R, G, and B may be formed in the region 10b. With such configuration, a more precise display is provided in the image display mode in the region 10b with pixels not containing the illumination light emitting element.

<Modification 4>

Although an organic EL element emitting a white light is provided as an illumination light emitting element in the second embodiment, the light emitted from the illumination light emitting element may be a light other than the white light, such as a blue light and a red light.

Third Embodiment

In the third embodiment, an organic EL display panel of a configuration different from the first and second embodiments is provided on the display 10.

<Configuration>

(Display 10)

Figure 8:
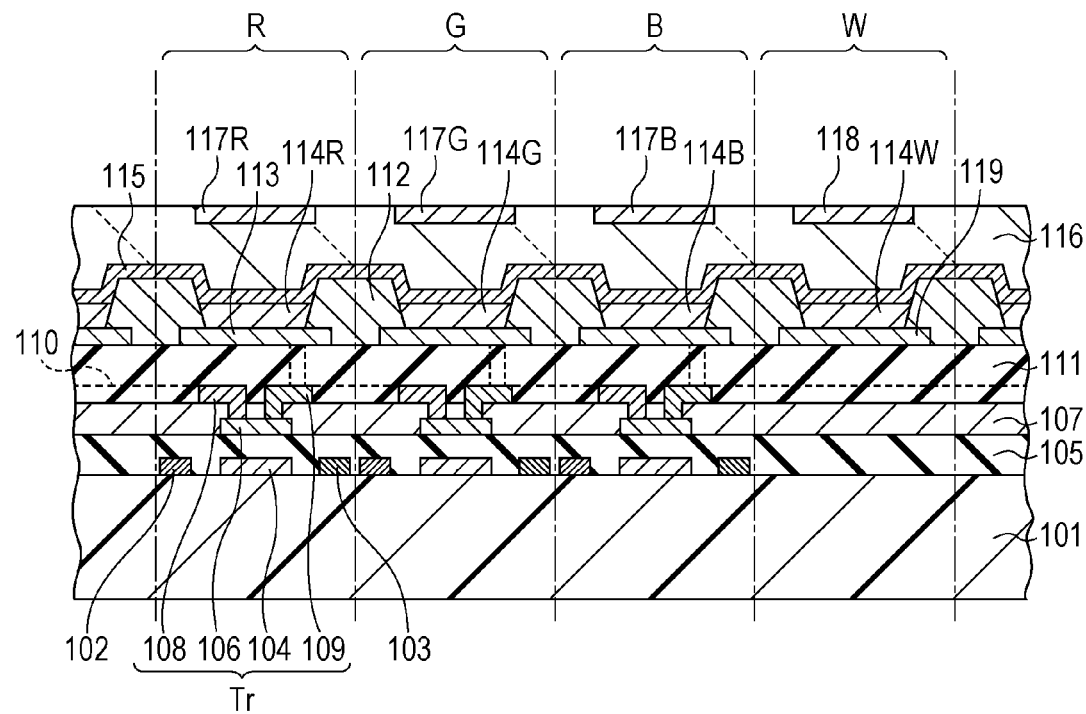
FIG. 8 is a fragmentary cross-sectional view showing a schematic configuration of a display that passively drives an illumination light emitting element according to a third embodiment.
Figure 9:
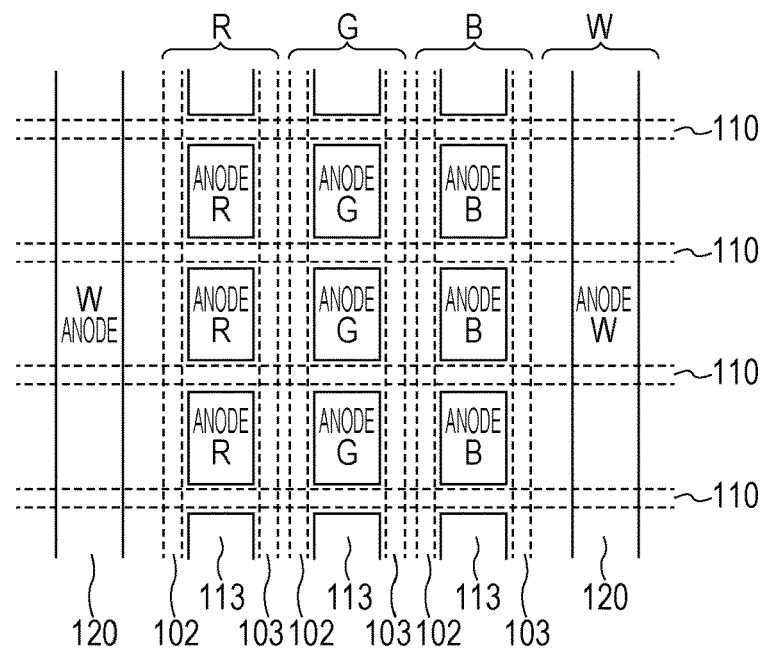
FIG. 9 shows an array of anodes in a display that passively drives an illumination light emitting element according to the third embodiment.

FIG. 8 is a fragmentary cross-sectional view showing one pixel of a display 10 according to the third embodiment. FIG. 9 is a plane view of a layer in the display 10 in which anodes 113 and 119 are formed, with respect to a substrate 101.

The display 10 shown in FIG. 8 is different from the display according to the second embodiment shown in FIG. 7 in respect of the configuration of the illumination light emitting element. Specifically, the illumination light emitting element according to the third embodiment is formed by a configuration not containing the data signal line 102, the power supply line 103, and the thin film transistor Tr. Although FIG. 8 shows that the scan signal line 110 is also wired to a region of the illumination light emitting element, the scan signal line 110 is connected only to the R light emitting element, the G light emitting element, and the B light emitting element, but not to the illumination light emitting element.

The anode 119 of the illumination light emitting element extends in a longitudinal direction of the display surface as illustrated in FIG. 9, and is shared by all pixels arranged in the longitudinal direction of the display surface.

<Display/Illumination Controller 32>

In the illumination light emitting element of such configuration, the line of pixels arranged in a transverse direction of the display surface needs not to be selected with an input signal of the scan signal line 110. Thus, when driving the display 10 in the illumination mode, the display/illumination controller 32 selects only lines of pixels arranged in the longitudinal direction of the display surface according to the illumination image. The display/illumination controller 32 applies current as part of the illumination signal to the anode 119 shared by a plurality of illumination light emitting elements included in lines of selected pixels.

For the R light emitting element, the G light emitting element, and the B light emitting element, the display/illumination controller 32 indicates the brightness for each of the elements via the data signal line, and the scan signal line similarly with the first embodiment.

<Summary>

The display 10 of the above configuration is easy to manufacture since configuration of the illumination light emitting element is simple. Although R, G, and B light emitting elements are driven by the active matrix drive system, the illumination light emitting element is driven by the passive drive system, which allows simplified light emission control of the illumination light emitting element.

<Other Modification>

(Shape of Display 10)

In the first to third embodiments, image display systems configured by using the display 10 with the display surface of a long rectangular shape are described. However, the image display system may be provided with a display with the display surface of a different shape.

Figure 10:
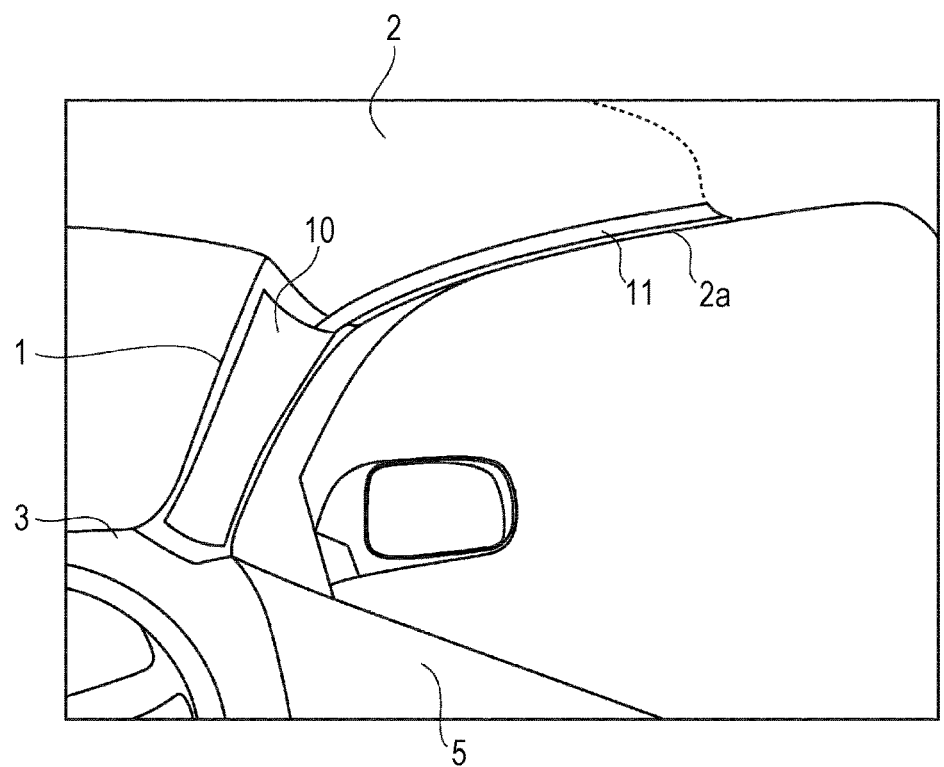
FIG. 10 shows a modification including a display provided at an edge part of a ceiling section.

For example, a strip-shaped stretching display 11 may be used in addition to the display 10 as illustrated in FIG. 10. The stretching display 11 may be arranged at an edge part 2a of a ceiling section 2 such that a display surface thereof is connected to a display surface of the display 10 at an end portion in the longitudinal direction.

When such display 10 and stretching display 11 are used in the image display system, the image generator 31 generates a blind spot condition image for the display 10, and a blind spot condition image for the stretching display 11.

The illumination pattern storage unit 33 saves an illumination image for the display 10, and an illumination image for the stretching display 11.

When driving the display 10 and the stretching display 11 in the image display mode, the display/illumination controller 32 generates an image signal from blind spot condition images corresponding to each of the displays, and outputs the image signal. When driving the display 10, and the stretching display 11 in the illumination mode, the display/illumination controller 32 generates an image signal from illumination images corresponding to each of the displays, and outputs the image signal.

The edge part 2a is a region of the ceiling section 2, adjoining the side window 6 when the door 5 is in the closed state. In the vehicle, the surface of the edge part 2a is often formed approximately downward. Thus, when the stretching display 11 is driven in the illumination mode with the door 5 open, the light emitted from the stretching display 11 preferably illuminates the occupant step at the doorway.

A non-rectangular display formed by integrating display surfaces of the display 10 and the stretching display 11 also may be used.

(Location 1 of Display 10)

Although the display 10 is provided on the surface of the front pillar 1 in the first to third embodiments, the display may be provided at a different location. For example, the display may be provided in an interior portion such as the center pillar, the dashboard, and the door, out of vehicle body structures inside the cabin.

The display installation location is preferably at a portion of a vehicle body structure where a blind spot is formed to the driver in the driving posture, since the driver can visually recognize the blind spot condition in the image display mode.

The display installation location is preferably at a portion of a vehicle body structure surrounding the door 5 and the side window 6 when the door 5 is in the closed state, since the occupant step is preferably illuminated at the doorway when the door 5 is in the open state.

(Location 2 of Display 10)

Although examples of the display 10 provided on the front pillar 1 on the driver side are described in the first to third embodiments, the image display system may be formed by providing a display on each front pillar 1 on the driver side and the passenger side.

In this case, the ECU 40 notifies the display/illumination controller 32 of the open/closed state for each of doors on the driver side and the passenger side by vehicle state information.

The display/illumination controller 32 performs switching control illustrated in FIG. 6 individually for a display provided on each front pillar 1 on the driver side and the passenger side.

With this configuration, the display/illumination controller 32 can control such that the illumination image is displayed only on a display provided on a front pillar on a side where it is notified that the door is open.

(Configuration 1 of Display 10)

The image display system may be provided with a display of a configuration different from those described in the first to third embodiments.

Figure 11:
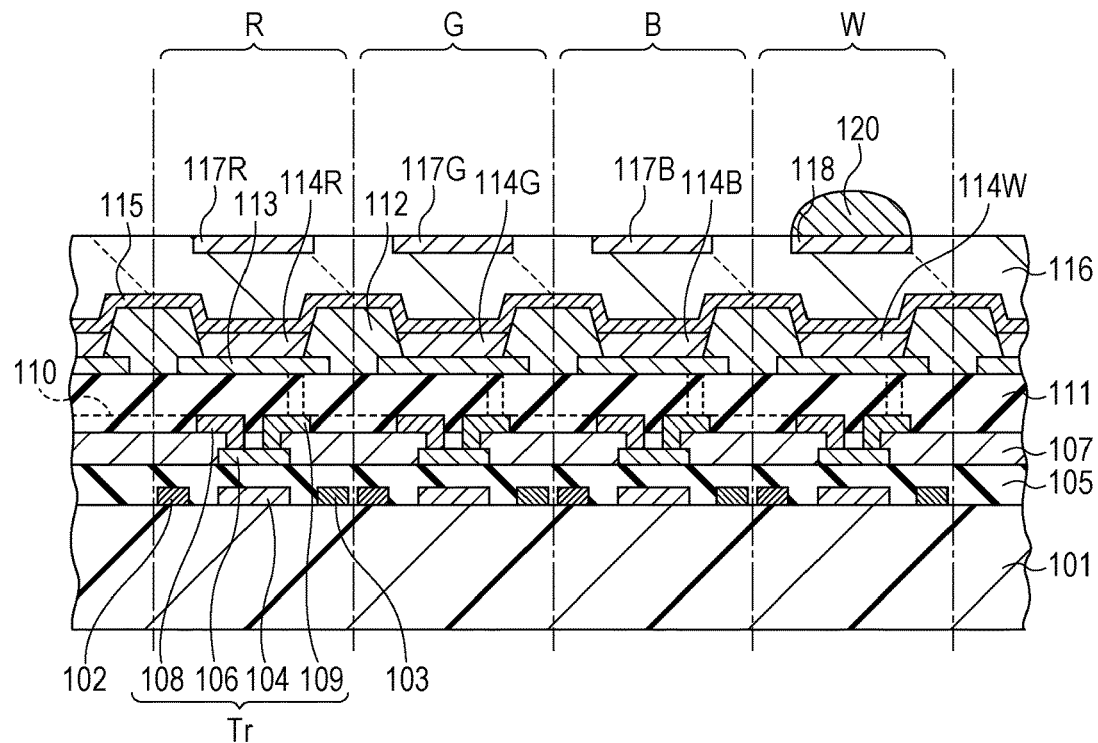
FIG. 11 is a fragmentary cross-sectional view showing a schematic configuration of a display according to a modification including a lens provided on an optical path of a light emitted from an illumination light emitting element.

As illustrated in FIG. 11, a lens 120 may be provided on a color filter 118 in a display where one pixel comprises R, G, B, and illumination light emitting elements.

The lens 120 is a condenser lens, being located at an optical path of the light emitted from the illumination light emitting element. Thus, directivity of the light emitted from the illumination light emitting element can be enhanced. Consequently, in the illumination mode, only the step can be illuminated efficiently at the doorway, and reflection to the windshield 4 can be further reduced.

Further, instead of forming the lens 120 by using the condenser lens in all regions of the display surface, the lens 120 may be formed by selectively using the condenser lens and the light diffusion lens for each of regions on the display surface.

For example, in the region 10a on the side of the door 5 illustrated in FIG. 5B, a condenser lens may be used as the lens 120, and a light diffusion lens may be used as the lens 120 in the region 10b on the side of the windshield 4. With such configuration, even when an image being in white in all regions is used as an illumination image, a light emitted from the region 10b on the side of the windshield 4 with the illumination image displayed is diffused. Consequently, glare due to reflection of a light emitted from the region 10b onto the windshield 4 can be reduced while a wide area in the cabin is illuminated with the light emitted from the region 10b.

(Configuration 2 of Display 10)

Figure 12:
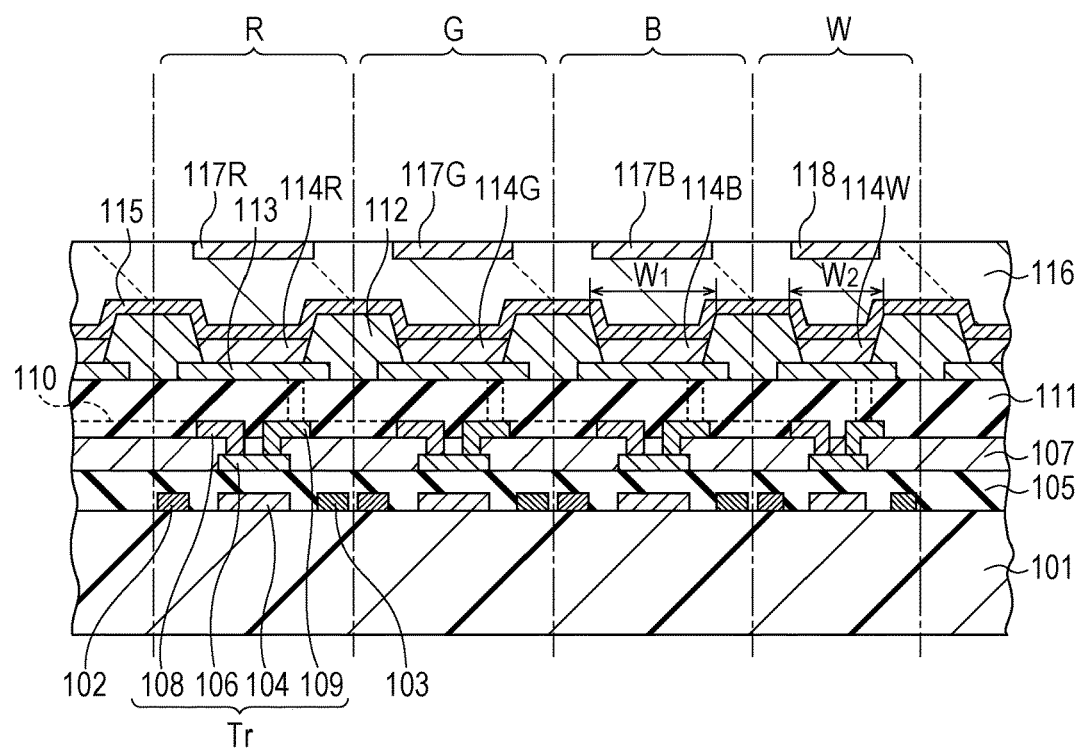
FIG. 12 is a fragmentary cross-sectional view showing a schematic configuration of a display according to a modification wherein an aperture width of an illumination light emitting element is narrowed.

As illustrated in FIG. 12, an aperture width W2 of the illumination light emitting element may be narrower than an aperture width W1 of the other light emitting element. An aperture width in the longitudinal direction of the display surface orthogonal to the paper face is formed to be identical in any light emitting element. For this reason, an area of the aperture through which the light is emitted (hereinafter, referred to as the "light emission area") is smaller in the illumination light emitting element than the other light emitting element.

All of R, G, B, and illumination light emitting elements include the same thin film transistor. Thus, maximum current amount feedable to any of the light emitting elements from a driving transistor is the same.

However, since the light emission area of the illumination light emitting element is smaller than the light emission area of other light emitting elements, current density in the organic light emitting layer is higher in the illumination light emitting layer than in other light emitting elements, even when the same current amount is fed. Since the organic EL element is a current driven element, the illumination light emitting element in which current flows with high current density emits the light with high brightness. Therefore, the doorway can be illuminated with high brightness in the illumination mode.

(Modification of Illumination Image)

In the first to third embodiments, examples of using, as the illumination image, an image divided to two parts including a region where pixel's color is white, and a region where pixel's color is black are described. However, the other image may be used as the illumination image as long as the image is of a fixed pattern.

For example, an image in which color of pixels is the same in all regions thereof may be used as the illumination image. Color of the illumination image causing the display surface of the display to emit the light is not limited to white color. For example, color may be the other color such as red, orange, yellow, green, blue, indigo blue, and purple.

Alternatively, an image in which brightness of pixels is the same in all regions thereof may be used as the illumination image. Alternatively, an image in which color tone of pixels is the same in all regions thereof may be used as the illumination image. Here, the same color tone of pixels means that the brightness ratio of sub-pixels forming the pixel including the red sub-pixel, the green sub-pixel, and the blue sub-pixel is the same among the sub-pixels.

As the other example, an image in which color of pixels is the same in a region thereof, but different from color of pixels in other regions may be used as the illumination image. Alternatively, an image in which brightness of pixels is same in a region thereof, but different in other regions may be used as the illumination image. Alternatively, an image in which color tone of pixels is same in a region thereof, but different in other regions may be used as the illumination image. A region in these illumination images in which at least one of the color, brightness, and color tone is the same among all pixels is preferably displayed in a region facing the doorway on the display surface of the display. In particular, when the display is installed along the shape of the surface of the front pillar, a region of the illumination image in which the color, brightness, and color tone is the same among all pixels is preferably displayed in a region of the display surface corresponding to a location of the front pillar closer to the door. On the display installed along the shape of the surface of the front pillar, light emitted from the display surface at a location of the front pillar closer to the door travels approximately toward the doorway.

As the other example, an image in which color arrangement having gradation is provided such that pixel brightness gradually decreases from a region having maximum pixel brightness to a region having minimum pixel brightness may be used as the illumination image. In such an illumination image, color is preferably arranged such that pixel brightness becomes highest at a location of the front pillar closer to the door, and pixel brightness becomes lowest at a location of the front pillar closer to the windshield.

(Modification of Blind Spot Condition Image)

In the first to third embodiments, a region of an captured image taken by the camera 20 is cut out along the shape of the display surface of the display 10, and the cutout is used as a blind spot condition image by rotating by an inclination angle θ of the front pillar 1. However, an image generated by the other method may be used as a blind spot condition image if the image indicates condition of the blind spot region to the driver.

Figure 13A:
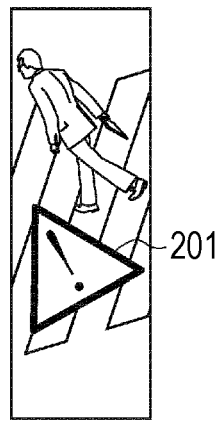
FIGS. 13A to 13E show other examples of the blind spot condition image.

For example, an image illustrated in FIG. 13A may be used as a blind spot condition image. The blind spot condition image is formed by superimposing the image of exclamation mark 201 on an image cut out in the shape of the display surface of the display 10 from a portion the captured image corresponding to the blind spot region.

Such a blind spot condition image may be generated in the image generator 31 by using a person detection technique that detects the human image from an image. Specifically, the technique determines whether an image cut out from the captured image includes a human image, and if the human image is included, generates the blind spot condition image by superimposing the image of exclamation mark 201 thereon before rotating the cutout image by an angle θ.

Here, the location where the image of exclamation mark 201 is superimposed on the cutout image may be a location corresponding to the center of the display surface. In this case, driver's attention can be attracted effectively.

Alternatively, the location where the image of exclamation mark 201 is superimposed on the cutout image may be a location corresponding to a portion closer to a lower end of the display surface. It is considered that a cutout image at a location corresponding to a portion closer to an upper end of the display surface shows a place more apart from the vehicle than a cutout image at a location corresponding to a portion closer to a lower end of the display surface. Consequently, a cutout image at a location corresponding to a portion closer to the upper end of the display surface shows a smaller human image. Therefore, when an image of the exclamation mark 201 is superimposed at a location corresponding to a portion closer to an upper end of the display surface of the cutout image, whole of the human image may be covered with the image of exclamation mark 201. However, coverage of the entire human image may be suppressed by superimposing the image of exclamation mark 201 on the cutout image at a location corresponding to a portion closer to a lower end of the display surface.

As a person detection technique, for example, a technique is known that generates an edge gradient histogram for a region in an image, and determines from the shape of the histogram whether there exists a human image.

Figure 13B:
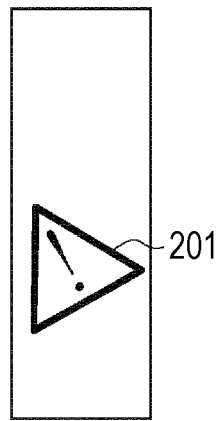

As the other example, the image generator 31 may determine whether an image cut out from a captured image includes a human image, and if a human image is included, an image illustrated in FIG. 13B may be used as a blind spot condition image. The blind spot condition image of this example is an image having a shape of the display surface including only the image of exclamation mark 201 rotated by the angle θ.

In the examples illustrated in FIGS. 13A and 13B, driver's attention can be attracted by highlighting the condition of "there is a person such as a pedestrian" in the blind spot area, with a blind spot condition image generated based on the captured image.

Although in the examples illustrated in FIGS. 13A and 13B, an image of the exclamation mark is used as a symbol image (hereinafter referred to as the "attention attracting image") that attracts attention of the driver, the other image such as a character string may be used as the attention attracting image.

Figure 13C:
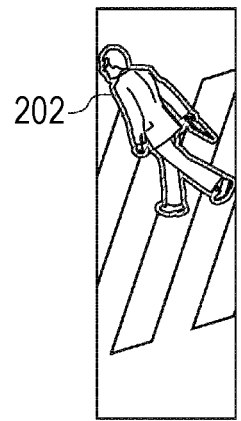

For example, an edged image 202 of a fluorescent color as illustrated in FIG. 13C may be used as an attention attracting image being superimposed on an image cut out from the captured image. When an human image is included in the cutout image, the blind spot condition image illustrated in FIG. 13C may be generated by superimposing the edged image 202 on the human image before rotating the cutout image by θ in the image generator 31.

The blind spot condition images illustrated in FIGS. 13A and 13C can suppress driver's overlook of the human image better than the blind spot condition image according to the first embodiment. The human image is likely to be overlooked especially when the blind spot condition image is generated based on an image of low saturation, such as a captured image taken in the evening or in a tunnel, or a captured image taken by using an infrared camera as the camera 20. In such a case, an image with an attention attracting image superimposed thereon is preferably used as a blind spot condition image.

(Utilization of Car Navigation System)

A variety of blind spot condition images also can be generated in conjunction with a conventional car navigation system.

Figure 13D:
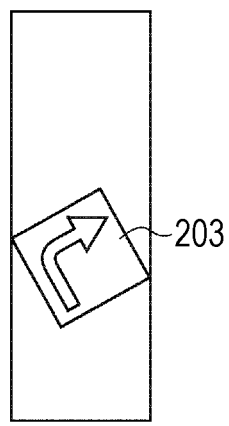

For example, the image generator 31 may analyze the captured image in response to an advance notice of right turn from a car navigation system, and if the captured image contains an image of the intersection, generate a blind spot condition image illustrated in FIG. 13D. The blind spot condition image of this example is an image having a shape of the display surface including only a right turn direction image 203 as an attention attracting image.

Alternatively, the image generator 31 may generate, as a blind spot condition image, an image with the right turn direction image 203 superimposed on an image cut out from the captured image.

In the examples illustrated in FIG. 13D, driver's attention can be attracted by showing the condition of "there is a side road to turn" in the blind spot region, with a blind spot condition image generated based on the captured image. Therefore, erroneous pass-through of the intersection due to the overlook can be suppressed by displaying such a blind spot condition image on the display 10.

Figure 13E:
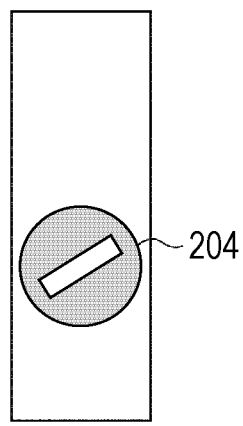

As the other example, the image generator 31 may receive a notice of the road regulation information such as, for example, vehicle approach prohibition from the car navigation system, and generate a blind spot condition image including a road sign image 204 illustrated in FIG. 13E. The blind spot condition image of this example is an image having a shape of the display surface including only a road sign image 204 as an attention attracting image.

Specifically, when an intersection approaches in the travel direction, the image generator 31 is noticed by the car navigation system of the road regulation of a road crossing the intersection from the right side, such as, for example, information showing the vehicle approach prohibition. The image generator 31 analyzes the captured image in response to the notice, and when the captured image contains an image of the intersection, generates a blind spot condition image including the road sign image 204 according to the noticed road regulation.

Alternatively, the image generator 31 may generate, as a blind spot condition image, an image with the road sign image 204 superimposed on an image cut out from the captured image.

In the examples illustrated in FIG. 13E, driver's attention can be attracted by indicating the condition of "there is a road of approach prohibition" in the blind spot region, with a blind spot condition image generated based on the captured image. Therefore, erroneous approach to a road of vehicle approach prohibition due to mistake can be suppressed by displaying such a blind spot condition image on the display 10.

When the image display system is configured with an additional display provided on a front pillar on the passenger side, the image generator 31 preferably further generates a blind spot condition image for the passenger seat. The blind spot condition image for the passenger seat is an image containing a road regulation image according to the road regulation for a road crossing the intersection from the left side. In this case, the display/illumination controller 32 preferably controls each display on the driver side and the passenger side to display a corresponding blind spot condition image.

(Location of Camera 20)

In the first to third embodiments, a configuration with the camera 20 installed on the front pillar 1 is described. However, the camera may be installed in another location as long as the location allows the camera to capture a blind spot region formed by a portion of a vehicle body structure where the display 10 is installed. For example, the camera may be installed on a door mirror, or on the exterior side of a ceiling section of a vehicle body. Further, instead of mounting a camera on a vehicle, a captured image taken by a camera arranged on a structure provided along a road such as an electric pole, and a traffic signal may be acquired via radio transmission.

(Type of Camera 20)

The camera 20 is not limited to a camera which captures an image by receiving a visible light, but may be an infrared camera which captures an image by receiving an infrared ray.

Safety in the evening and in a tunnel can be enhanced by using a captured image taken by an infrared camera for generating a blind spot condition image, and displaying the blind spot condition image on the display.

The present disclosure can be utilized, for example, as an image display system used by mounting on a vehicle. Especially, an image display system capable of preferably illuminating the step when getting off the vehicle can be expected by providing a display used for both image display and illumination on a front pillar.

What is claimed is:

1. An image display system to be mounted within a vehicle, the vehicle including a door that is provided on a doorway and a vehicle body structure that blocks view of a driver of the vehicle, the image display system comprising:
   a display provided in an interior surface of the vehicle body structure;
   a camera adapted to capture an image of a blind spot region outside the vehicle body structure, wherein the blind spot region is caused by the view of the driver to be blocked by the vehicle body structure; and
   a controller adapted to cause the display to display the image of the blind spot region captured by the camera, when the door is in a closed state,
   wherein
   the camera is adapted to capture an image of an extended region including the image of the blind spot region,
   the image display system further comprises an image processor adapted to generate the image of the blind spot region based on the image of the extended region captured by the camera, by extracting, from the image of the extended region, the image of the blind spot region in a shape of the display,
   the vehicle body structure comprises a front pillar,
   an interior surface of the front pillar includes a curved shape, and
   the display is provided in the interior surface of the front pillar along the curved shape of the interior surface of the front pillar.

2. The image display system according to claim 1, wherein
   the vehicle further includes a windshield, and the front pillar is located at a boundary between the door and the windshield.

3. The image display system according to claim 2, wherein
   the display includes a first display region facing the doorway and a second display region not facing the doorway.

4. The image display system according to claim 1, wherein
   the display comprises pixels including sub-pixels of different colors.

5. The image display system according to claim 3, wherein
   the curved shape is curved from a portion closer to the door to a portion closer to the windshield,
   the first display region is located at a portion closer to the door on the interior surface of the front pillar, and
   the second display region is located at a portion closer to the windshield on the interior surface of the front pillar.

6. The image display system according to claim 1, wherein
   the image processor further determines whether the image of the blind spot region includes a human image, and when it is determined that the human image is included in the image of the blind spot region, the image processor generates a symbol image that attracts attention of the driver to a human represented by the human image to combine the image of the blind spot region with the symbol image.

7. The image display system according to claim 1, wherein
   the display includes a first light emitting element which emits red light, a second light emitting element which emits blue light, a third light emitting element which emits green light, and a fourth light emitting element which emits illumination light.

8. The image display system according to claim 7, wherein
   the first light emitting element, the second light emitting element, the third light emitting element, and the fourth light emitting element are current driven type light emitting elements, and
   a width of an aperture through which light emitted from the fourth light emitting element is emitted is smaller than a width of an aperture through which light emitted from each of the first light emitting element, the second light emitting element, and the third light emitting element is emitted.

9. The image display system according to claim 7, wherein the display includes a lens on an optical path of a light emitted from the fourth light emitting element which emits the illumination light.

10. The image display system according to claim 1, wherein
the vehicle further includes a driver seat, a passenger seat and a windshield,
the door comprises a first door on a side of the driver seat and a second door on a side of the passenger seat,
the front pillar comprises a first front pillar located at a boundary between the first door and the windshield, and a second front pillar located at a boundary between the second door and the windshield, and
the display is provided on an interior surface of each of the first front pillar and the second front pillar.

11. The image display system according to claim 1, further comprising
an electronic control circuit adapted to detect whether the door is in an open state or in the closed state,
wherein the controller is adapted to control the display based on the detection by the electronic control circuit.

12. A display equipped with the image display system according to claim 1.

13. The image display system according to claim 1, wherein the camera is provided inside the front pillar.

14. The image display system according to claim 1, wherein
the image processor extracts the image of the blind spot region from the image of the extended region based on the shape of the display and an inclination of the front pillar.

15. The image display system according to claim 1, wherein the image processor generates the blind spot region by
extracting a cutout region image from the image of the extended region, the cutout region image having a shape of the display and an inclination angle determined based on an inclination of the front pillar, and
rotating the cutout region image, and performing coordinate transformation into an orthogonal coordinate system.

16. The image display system according to claim 1, wherein
the controller further determines whether or not the vehicle is traveling, and causes the display to display the blind spot image when the vehicle is determined to be traveling.

* * * * *